US008655623B2

(12) United States Patent
Duyanovich et al.

(10) Patent No.: US 8,655,623 B2
(45) Date of Patent: Feb. 18, 2014

(54) DIAGNOSTIC SYSTEM AND METHOD

(75) Inventors: Linda M. Duyanovich, Saratoga, CA (US); Kristal T. Pollack, San Francisco, CA (US); Elizabeth S. Richards, Columbia, MD (US); Sandeep M. Uttamchandani, San Jose, CA (US)

(73) Assignees: International Business Machines Corporation, Armonk, NY (US); National Security Agency, Washington, DC (US)

( * ) Notice: Subject to any disclaimer, the term of this patent is extended or adjusted under 35 U.S.C. 154(b) by 775 days.

(21) Appl. No.: 11/674,198

(22) Filed: Feb. 13, 2007

(65) Prior Publication Data
US 2008/0195369 A1 Aug. 14, 2008

(51) Int. Cl.
*G21C 17/003* (2006.01)
(52) U.S. Cl.
USPC ........... 702/182; 702/59; 702/82; 702/84; 702/184
(58) Field of Classification Search
USPC ............................ 702/59, 82, 84, 184
See application file for complete search history.

(56) References Cited

U.S. PATENT DOCUMENTS

| | | | |
|---|---|---|---|
| 4,805,089 A | 2/1989 | Lane et al. | |
| 5,933,821 A | 8/1999 | Matsumoto et al. | |
| 6,006,016 A * | 12/1999 | Faigon et al. | 714/48 |
| 6,115,393 A * | 9/2000 | Engel et al. | 370/469 |
| 6,374,251 B1 * | 4/2002 | Fayyad et al. | 1/1 |
| 6,701,459 B2 | 3/2004 | Ramanathan et al. | |
| 6,801,940 B1 | 10/2004 | Moran et al. | |
| 7,031,878 B2 | 4/2006 | Cuddihy et al. | |
| 7,155,715 B1 | 12/2006 | Cui et al. | |
| 7,266,733 B2 | 9/2007 | Bazinet et al. | |
| 7,395,187 B2 | 7/2008 | Duyanovich et al. | |
| 2002/0123983 A1 | 9/2002 | Riley et al. | |
| 2003/0046390 A1 * | 3/2003 | Ball et al. | 709/224 |
| 2003/0110007 A1 * | 6/2003 | McGee et al. | 702/179 |

(Continued)

FOREIGN PATENT DOCUMENTS

| | | |
|---|---|---|
| WO | WO9912167 | 9/1999 |
| WO | WO 2004/088443 A1 | 10/2004 |
| WO | WO2006017027 | 2/2006 |

OTHER PUBLICATIONS

Shah, et al., "Challenges in the Detection, Diagnosis and Visualization of Controller Performance Data," The IEEE Control & Automation Professional Network, Extended version of a paper that was presented at Control Systems—2004, pp. 7-21.

(Continued)

*Primary Examiner* — Sujoy Kundu
*Assistant Examiner* — Elias Desta
(74) *Attorney, Agent, or Firm* — Gibb & Riley, LLC

(57) ABSTRACT

Disclosed are system and method embodiments for determining the root-causes of a performance objective violation, such as an end-to-end service level objection (SLO) violation, in a large-scale system with multi-tiered applications. This determination is made using a hybrid of component-level snapshots of the state of the system during a period in which an abnormal event occurred (i.e., black box mapping) and of known events and their causes (i.e., white-box mapping). Specifically, in response to a query about a violation (e.g., why did the response time for application a1 increase from r1 to r2), a processor will access and correlate the black-box and white-box mappings to determine a short-list of probable causes for the violation.

18 Claims, 7 Drawing Sheets

(56) References Cited

U.S. PATENT DOCUMENTS

| | | | |
|---|---|---|---|
| 2003/0149919 A1* | 8/2003 | Greenwald et al. | 714/43 |
| 2003/0167180 A1 | 9/2003 | Chung et al. | |
| 2004/0015719 A1* | 1/2004 | Lee et al. | 713/201 |
| 2004/0123029 A1 | 6/2004 | Dalal et al. | |
| 2004/0163079 A1 | 8/2004 | Noy et al. | |
| 2004/0243699 A1 | 12/2004 | Koclanes et al. | |
| 2004/0260678 A1 | 12/2004 | Verbowski et al. | |
| 2005/0038818 A1 | 2/2005 | Hooks | |
| 2005/0091227 A1 | 4/2005 | McCollum et al. | |
| 2005/0125710 A1 | 6/2005 | Sanghvi | |
| 2005/0203792 A1 | 9/2005 | Kuppe et al. | |
| 2005/0216325 A1 | 9/2005 | Ziad et al. | |
| 2005/0265331 A1* | 12/2005 | Stolfo | 370/389 |
| 2006/0036619 A1 | 2/2006 | Fuerst et al. | |
| 2006/0085854 A1* | 4/2006 | Agrawal et al. | 726/23 |
| 2006/0112135 A1 | 5/2006 | Warshawsky | |
| 2006/0123278 A1 | 6/2006 | Dini et al. | |
| 2006/0129998 A1 | 6/2006 | Florissi et al. | |
| 2006/0150163 A1 | 7/2006 | Chandane | |
| 2007/0168915 A1* | 7/2007 | Fabbio et al. | 717/101 |

OTHER PUBLICATIONS

Pollack, et al., "Genesis: A Scalable Self-Evolving Performance Management Framework for Storage Systems," IEEE Computer Society, Proceedings of the 26$^{th}$ IEEE International Conference on Distributed Computing Systems, 2006, 10 pages total.

U.S. Appl. No. 11/348,010, filed Feb. 6, 2006, Duyanovich, et al.

Chung, et al., "Using Information from Prior Runs to Improve Automated Tuning Systems, Proceedings of SC" 04, Nov. 2004, pp. 1-12.

Deng, et al., "High-Performance Robust Speech Recognition Using Stereo Training Data," Proceedings of International Conference on Acoustics, Speech, and Signal Processing, May 2001, pp. 301-304.

Chron et al., U.S. Appl. No. 11/674,197, Office Action Communication, Aug. 20, 2009, 12 pages.

Chron et al., U.S. Appl. No. 11/674,197, Office Action Communication, Feb. 3, 2010, 13 pages.

Chron et al., U.S. Appl. No. 11/674,197, Office Action Communication, Jul. 23, 2010, 12 pages.

U.S. Appl. No. 11/674,197, filed Feb. 13, 2007, Notice of Allowance Communication, Apr. 25, 2012, 13 pages.

U.S. Appl. No. 11/348,010, filed Feb. 6, 2006, Duyanovich, et al., Pending Publication.

Chung, et al., "Using Information from Prior Runs to Improve Automated Tuning Systems," Proceedings of SC04, Nov. 2004, pp. 1-12.

Anderson, E., "HPL-SSP-2001-4: Simple table-based modeling of storage devices," Jul. 14, 2001, pp. 1-4.

Deng, et al., "High-Performance Robust Speech Recognition Using Stereo Training Data," Proceeding of International Conference on Acoustics, Speech, and Signal Processing, May 2001, pp. 301-304.

Gullickson, et al., "Using Experience to Guide Web Server Selection," Multimedia Computing and Networking, Jan. 1999, pp. 1-12.

Narayanan, et al., "Using History to Improve Mobile Application Adaptation," Proceedings of the 3$^{rd}$ IEEE Workshop on Mobile Computing Systems and Applications, Dec. 2000, pp. 1-10.

Hartigan, John, "Clustering Algorithms," 99$^{th}$ Edition, John Wiley & Sons, Inc., 1975, pp. 351.

* cited by examiner

Workflow

| ID | Read/Write variance | Rand/Seq | Rand/Seq variance | Request size | Size variance | IOPS | IOPS variance | Latency | Latency variance | Size | Time |
|---|---|---|---|---|---|---|---|---|---|---|---|
| 0 | .14 | .2 | .04 | 8003 | 1743 | 206 | 104 | .04 | .010 | 8 | 1295 |
| 1 | .31 | .4 | .12 | 3932 | 987 | 489 | 278 | .01 | .005 | 10 | 954 |
| 2 | .25 | .5 | .18 | 4234 | 568 | 355 | 213 | .02 | .010 | 7 | 742 |

Load-Performance

Dependencies

| Component | Component | %requests | %variance |
|---|---|---|---|
| Workload 1 | Client X | 28 | 46 |
| Workload 2 | Client Y | 34 | 33 |
| Client X | Pool A | 80 | 84 |
| Client Y | Pool A | 56 | 23 |

Workflow

| Component |
|---|
| Workload 1 |
| Workload 2 |
| Client X |
| Client Y |

| Component |
|---|
| Client X |
| Client Y |
| Pool A |
| Pool A |

Figure 4

DIAGNOSTIC SYSTEM AND METHOD

STATE REGARDING FEDERALLY SPONSORED RESEARCH OR DEVELOPEMENT

This invention was made with Government support under Agreement Number H98230-05-3-0001 awarded by Intelligence Agencies. The Government has certain rights in the invention.

CROSS-REFERENCE TO RELATED APPLICATIONS

This application is related to U.S. patent application Ser. No. 11/674,197, filed on Feb. 13, 2007, and issued on Sep. 4, 2012 as U.S. Pat. No. 8,260,622, assigned to the IBM Corporation, and the complete disclosure of which is fully incorporated herein by reference.

BACKGROUND

1. Field of the Invention

The embodiments of the invention generally relate to diagnostic systems and methods and, more particularly, to a diagnostic system and method for determining the root-cause of detected abnormalities in application workflows.

2. Description of the Related Art

In large scale environments, a storage administrator supports the requirements of multiple applications such as databases, web-servers, on-line customer transactions, decision support and supply chain analysis, financial applications. The end-to-end performance requirements of these applications are specified as Service Level Objectives (SLOs) that prescribe thresholds for maximum latency, minimum throughput, minimum availability, etc. Specifically, the storage administrator is required to continuously respond to run-time system-induced and human-induced events (e.g., failures, storage component overloads, changes in the input/output (IO) access characteristics due to changes in the application configuration, application or hardware additions, etc.) in order to ensure that the SLOs are being met. If one or more SLOs for a given application are violated, the storage administrator typically decides what corrective actions should be taken in response to the violation(s). To do this, the storage administrator must review an event log for the application invocation path components, determine the impact on the application SLOs of the events contained in the event log, develop a short-list of events that might have caused the SLO violations, and finally, decide the corrective actions that should be taken in response to these causal events.

SUMMARY

In view of the foregoing, the embodiments of the invention disclosed herein provide an analysis framework that assists a system administrator in determining the root-causes of a performance objective violation, such as an end-to-end service level objective (SLO) violation. This analysis framework uses a hybrid white-box and black-box mapping of events to their impact on system behavior. The black-box mapping is recorded as a series of component-level snapshots of system behavior annotated with events that happened during consecutive snapshots. The white-box mapping keeps track of known event semantics for a subset of commonly occurring events. The event semantics include, for example, the nature of the event, the components affected by the event, and the changes in the dynamic dependencies of the invocation path components resulting from the event. In response to a query about a specific SLO violation from a storage administrator (e.g., why did the response time for application a1 increase from r1 to r2), a processor within the analysis framework will correlate the black-box and white-box mapping to determine a short-list of probable causes for the SLO violation.

More specifically, disclosed are embodiments of a diagnostic system for determining probable causes (e.g., developing a short-list of causes) of a violation of a performance objective (e.g., of a service level objective (SLO) violation) for an application performed by a primary system (e.g., a large-scale storage system). The diagnostic system can comprise a performance monitoring system, an abnormality detection system, a state generator, a common events database and a processor.

The performance monitoring system can comprise a plurality of monitoring agents adapted to periodically sense the measurable performance parameters of individual system components within the different tiers (e.g., application servers, interconnect switches, controllers, disks, etc.) of the invocation paths of the applications that are being performed by the primary system (e.g., a large-scale storage system). This monitoring system can further be adapted to store the measured performance parameters as collected data in a data storage device, such as a monitoring system database.

The abnormality detection system can be in communication with the performance monitoring system. The abnormality detection system can be adapted to automatically develop and periodically update normal performance models for the primary system components based on the periodically collected data (i.e., based on the measured performance data from the performance monitoring system). These models can be stored in a storage device, such as a database within the abnormality detection system. The abnormality detection system can further be adapted to automatically identify, based on the normal performance models, any abnormal events occurring in the invocation path during running of a given application. A record of these abnormal events can also be stored in a storage device, such as a database within the abnormality detection system. Specifically, the abnormality detection system can be adapted to develop these normal performance models and to identify any abnormal events by using a data clustering approach.

The state generator can be in communication with the monitoring system and can be adapted to automatically identify, based on the periodically collected data from the performance monitoring system, state changes exhibited during a given time interval by the different primary system components that are within the invocation path of a given application. These state changes can, for example, comprise run-time changes that, for a given component, will impact workload access, cumulative load, response-time and throughput for a given load characteristic, dependencies and/or workflow of the application. However, while operation of the state generator can be automatic, it can further be policy-based rather than continuous or periodic (i.e., occurring at regular intervals). That is, rather than continuously or periodically determining the state of system components, operation of the state generator can be triggered during the given time interval based upon a predetermined policy. For example, the predetermined policy can provide that state generator operation is to be triggered by the identification of any abnormal event during the running of the application, by the identification of at least one specified type of abnormal event during the running of the application, by the identification of a specified number of abnormal events during the running of the application, by the identification of a specified number of a specified type of abnormal events during the running of the application, etc. Thus, the given time interval in which the state changes are identified is the period between the point in time, before the occurrence of the triggering condition, when the measured performance parameter data was last collected and stored by the performance monitoring system, and the point in time, after the occurrence of the triggering condition, when the measured performance parameter data is next collected. A record of these state changes can be stored in a storage device, such as a database within the state generator itself.

The common events database can comprise a stored list of common events that may occur within the primary system. This list can be based on industry and expert knowledge and may further indicate all of the system components known to be affected by the common events as well as an indication of any changes in dynamic dependencies resulting from the common events.

Finally, the processor can be in communication with the state generator and, particularly, the storage device containing the record of the component state changes and also in communication with the common events database. This processor can further be adapted to receive and to automatically respond to queries regarding a violation of a specific application performance objective (i.e., regarding an SLO violation). Specifically, in response to a query, the processor can be adapted to access both the state changes database and the common events database and to correlate the common events listed in the common events database with the state changes recorded by the state generator in order to determine a set of events that are probable causes for the violation of the performance objective (i.e., to develop a short-list of causes of the SLO violation mentioned in a query).

Additionally, embodiments of an associated method for diagnosing probable causes (e.g., for developing a short-list of causes) of a violation of a performance objective (e.g., of a service level objective (SLO) violation) for an application being performed by a primary system (e.g., a large-scale storage system) are disclosed.

The method can comprise providing, based on expert and industry knowledge, a list of common events that may occur within the primary system and storing the list in a common events database. Providing the list can further comprise indicating on the list all system components that are known to be affected by the common events as well as indicating changes in dynamic dependencies resulting from the common events.

The method can also comprise periodically monitoring a plurality of the system components within the different tiers (e.g., application servers, interconnect switches, controllers, disks, etc.) of the I/O invocation paths of the applications being performed by the primary system. This periodic monitoring can be accomplished, for example, using a performance monitoring system comprising a plurality of corresponding monitoring agents that are adapted to sense measurable performance parameters The measured performance parameters for each of the system components can be stored as collected data in a storage device, such as a database within the performance monitoring system.

Next, normal performance models for the system components (i.e., for the components of the primary system that are within the invocation path of a given application) can be automatically developed by an abnormality detection system and stored within a storage device, such as a database within the abnormality detection system. These normal performance models can be developed based on the periodically collected data (i.e., the measured performance data) from the performance monitoring system. Once the normal performance models are developed, they can be used to automatically identify abnormal events occurring in the invocation path of a given application. The normal performance models can be developed and the abnormal events can be identified using, for example, a data clustering approach.

Then, any state changes exhibited, during a given time interval, by any of the system components within the I/O invocation path of the application can be automatically identified using a state generator and stored in a storage device, such as a database within the state generator. Identifying the state changes can comprise identifying run-time changes that, for a given component, will impact at least one of workload access, cumulative load, response-time and throughput for a given load characteristic, dependencies and workflow of the application. This state changes identification process (i.e., operation of the state generator) can be initiated upon the occurrence of a triggering condition, as opposed to being performed continuously or periodically (i.e., at regular intervals). For example, this process can be triggered by the identification of any abnormal event during the running of the application, by the identification of at least one specified type of abnormal event during the running of the application, by the identification of a specified number of abnormal events during the running of the application, by the identification of a specified number of a specified type of abnormal events during the running of the application, etc. Thus, the given time interval in which the state changes are identified is the period between the point in time, before the occurrence of the triggering condition occurs, when the performance parameter data was last collected and stored by the performance monitoring system, and the point in time, after the occurrence of the triggering condition, when the performance parameter data is next collected.

Once these state changes are identified, a set of events that are probable causes for the violation of the performance objective (i.e., a short-list of SLO violation causes) can be automatically determined, by using a processor to correlate the common events listed in the common events database (including the components that are known to be affected by the common events as well as the changes in dynamic dependencies that result from the common events) with the state changes recorded in the state changes database.

Also disclosed is a program storage device readable by computer and tangibly embodying a program of instructions executable by that computer to perform the method of the invention, described above.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 4 is a stored representation of workflow, dependencies and the load-to performance mapping of the clusters of FIG. 3;

DETAILED DESCRIPTION OF PREFERRED EMBODIMENTS

Figure 1:
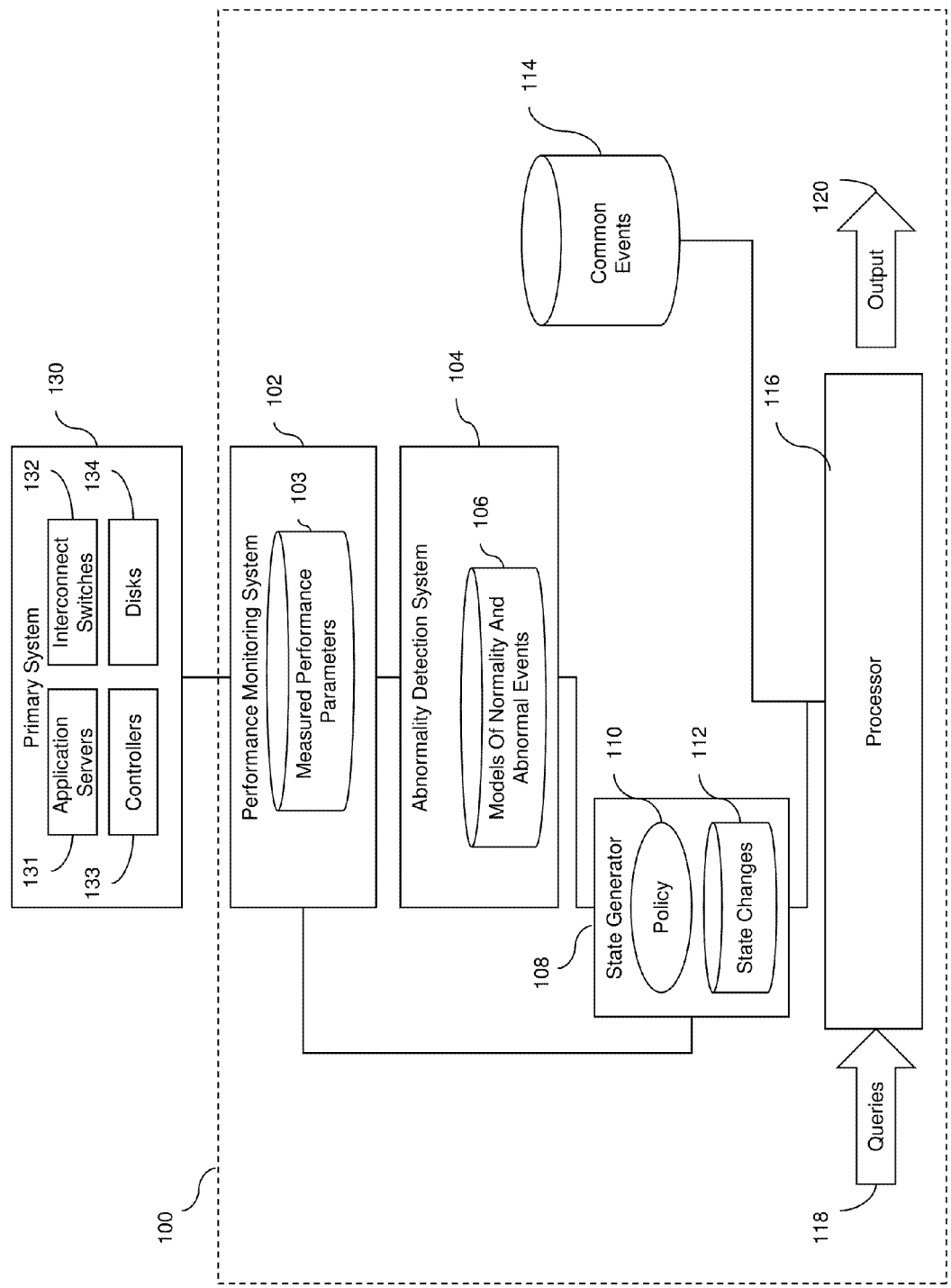
FIG. 1 is a schematic diagram illustrating an embodiment of a system of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, in large scale environments, a storage administrator supports the requirements of multiple applications such as databases, web-servers, on-line customer transactions, decision support and supply chain analysis, financial applications. The end-to-end performance requirements of these applications are specified as Service Level Objectives (SLOs) that prescribe thresholds for maximum latency, minimum throughput, minimum availability, etc. Specifically, the storage administrator is required to continuously respond to run-time system-induced and human induced events (e.g., failures, storage component overloads, changes in the input/output (IO) access characteristics due to changes in the application configuration, application or hardware additions, etc.) in order to ensure that the SLOs are being met. If one or more SLOs for a given application are violated, the storage administrator typically decides what corrective actions should be taken in response to the violation(s). To do this, the storage administrator must review an event log for the application invocation path components, determine the impact on the application SLOs of the events contained in the event log, develop a short-list of events that might have caused the SLO violations, and finally, decide the corrective actions that should be taken in response to these causal events.

More specifically, the invocation path of an application typically consists of one or more application servers (A), interconnect switches (S), virtualization controllers (C) such as SVC, and disks (D). The workflow of an application (e.g., a database, an e-mail system, a web-server, etc.) is represented as an ordered set $W_{e\_mail}=\{A,S,C,D\}$ such that A,S,C,D are sets with a cardinality $>=1$, representing the physical devices being used in that tier. For example, $A=\{\alpha_1,\alpha_5,\alpha_7\}$ represents servers $\alpha_1,\alpha_5,\alpha_7$ are used at the application server tier. Additionally, while the workflow represents the physical components used by the application, the abstraction of workload stream is used to capture the run-time IO activity of the application and it consists of the access characteristics as well as the percentage of the requests being served by the physical components in each of the tiers. This is referred to as dependency e.g., 70% of the e-mail IO requests are directed through switch $s_1$, and 30% through $s_2$. Run-time changes that occur in the system can be broadly classified as being either well-known events or unknown events (i.e., referred to as a ghost events). Irrespective of the category of change, the impact of such run-time change events can be represented as one of the following: (1) a change in the workload access, (2) a change in the cumulative load on a physical component, (3) a change in the component response-time and throughput for a given load characteristic, (4) a change in the dependencies, and (5) a change in the workflow.

In each tier of an invocation path of a given application there are often hundreds of log events and configuration changes that need to be parsed and analyzed, thus, storage administrates are finding it more and more difficult to determine the root cause of an SLO violation. That is, in order to the root cause of an SLO violation of a given application, storage administrators using existing commercial storage system management software will deploy extensive monitoring agents on each tier of the application's IO invocation path (e.g., on the application servers, network switches, storage controllers, disks, etc.). These monitoring agents periodically collect run-time information and add to a monitoring database. That is, they collect and store information from the available monitors regarding hundreds of events recorded on each of the different tiers, as well as collect and store information regarding the physical interconnection between the hardware components. This information allows the setting of trigger threshold values for measurable parameters. Thus, the existing storage system management software provides a "magnifying glass" view of the state of the storage system. However, such existing systems do not provide the "intelligence" that is needed by storage administrators to make a timely causal determination. Specifically, the number of events recorded by the monitoring agents on each tier can be significant and manually analyzing each of these events to understand the cause of such events can be nontrivial. Additionally, the impact of these events must be mapped to the workload SLOs and it is often difficult, if not impossible, for the storage administrator to correlate the different events on the different tiers with the violation of a specific SLO in order to pin-point the root-cause of the SLO violation.

In view of the foregoing, the embodiments of the invention disclosed herein provide an analysis framework that assists a system administrator in determining the root-causes of a performance objective violation, such as an end-to-end service level objective (SLO) violation. This analysis framework uses a hybrid white-box and black-box mapping of events to their impact on system behavior. The black-box mapping is recorded as a series of component-level snapshots of system behavior annotated with events that happened during consecutive snapshots. The white-box mapping keeps track of known event semantics for a subset of commonly occurring events. The event semantics include, for example, the nature of the event, the components affected by the event, and the changes in the dynamic dependencies of the invocation path components resulting from the event. In response to a query about a specific SLO violation from a storage administrator (e.g., why did the response time for application a1 increase from r1 to r2), a processor within the analysis framework will correlate the black-box and white-box mapping to determine a short-list of probable causes for the SLO violation.

More specifically, referring to FIG. 1, disclosed are embodiments of a diagnostic system 100 for determining probable root-causes (e.g., developing a short-list of root-causes) of a violation of a performance objective (e.g., of a service level objective (SLO) violation) for an application performed by a primary system 130 (e.g., a large-scale storage system). The diagnostic system 100 can comprise a performance monitoring system 102, an abnormality detection system 104, a state generator 108, a common events database 114 and a processor 116.

The performance monitoring system 102 can comprise a plurality of monitoring agents adapted to periodically sense the measurable performance parameters of individual system components within the different tiers (e.g., application servers 131, interconnect switches 132, controllers 133, such as virtualization controllers, disks 134, etc.) of the invocation paths of the applications that are being performed by the primary system 130 (e.g., by a large-scale storage system). This monitoring system 102 can further be adapted to store the measured performance parameters as collected data in a storage device, e.g., in a monitoring system database 103.

The abnormality detection system 104 can be in communication with the performance monitoring system 102. The abnormality detection system 104 can be adapted to automatically develop and periodically update normal performance models for the primary system components 131-134 based on the periodically collected data in the storage device 103 (i.e., based on the measured performance data from the performance monitoring system 102). These models can be stored in a storage device 106, such as a database within the abnormality detection system 104. The abnormality detection system 104 can further be adapted to automatically identify, based on the normal performance models, any abnormal events occurring in the invocation path during running of a given application. Such abnormal events can comprise run-time system-induced events as well as human-induced events, including failures, storage component overloads, changes in the input/output (IO) access characteristics due to changes in the application configuration, application or hardware additions, etc. A record of these abnormal events can also be stored in the storage device 106 within the abnormality detection system 104. Specifically, the abnormality detection system 104 can be adapted to develop these normal performance models and to identify any abnormal events by using a data clustering approach or any other approach capable of developing normality models and identifying abnormal events based on those models.

The state generator 108 can be in communication with the performance monitoring system 102 and can be adapted to automatically identify, based on the periodically collected data in storage device 103 from the performance monitoring system 102, state changes exhibited during a given time interval by the different primary system components 131-134 that are within the invocation path of a given application. These state changes can, for example, comprise run-time changes that, for a given component, will impact workload access, cumulative load, response-time and throughput for a given load characteristic, dependencies and/or workflow of the application. However, while operation of the state generator can be automatic, it can be policy-based 110 rather than continuous or periodic (i.e., occurring at regular intervals). That is, rather than continuously or periodically determining the state of system components, operation of the state generator 108 is triggered during the given time interval based upon a predetermined policy 110. For example, the predetermined policy 110 can provide that state generator operation is to be triggered by the identification of any abnormal event during the running of the application, by the identification of at least one specified type of abnormal event during the running of the application, by the identification of a specified number of abnormal events during the running of the application, by the identification of a specified number of a specified type of abnormal events during the running of the application, etc. Thus, the given time interval in which the state changes are identified is the period between the point in time, before the occurrence of the triggering condition, when the measured performance parameter data was last collected and stored by the performance monitoring system 102, and the point in time, after the occurrence of the triggering condition, when the measured performance parameter data is next collected. A record of these state changes can be stored in storage device 112, such as a database within the state generator 108 itself.

The common events database 114 can comprise a stored list of common events (i.e., commonly occurring run-time system-induced events and/or human-induced events, including failures, storage component overloads, changes in the input/output (IO) access characteristics due to changes in the application configuration, application or hardware additions, etc.) that may occur within the primary system 130. This list can be based on industry and expert knowledge and may further indicate all of the system components 131-134 known to be affected by the common events as well as an indication of any changes in dynamic dependencies resulting from the common events.

Finally, the processor 116 can be in communication with the state generator 108 and, particularly, the storage device 112 containing the record of the component state changes and also in communication with the common events database 114. This processor 116 can further be adapted to receive and to automatically respond to queries 118 regarding a violation of a specific application performance objective (i.e., regarding an SLO violation). Specifically, in response to a query 118, the processor 116 can be adapted to access both the state changes database 112 and the common events database and to correlate the common events listed in the common events database (including the components that are known to be affected by the common events as well as the changes in dynamic dependencies that result from the common events) with the history of state changes recorded by the state generator 108 in order to determine a set of events that are probable causes for the violation of the performance objective (i.e., to develop and output 120 a short-list of causes of the SLO violation mentioned in a query).

Figure 2:
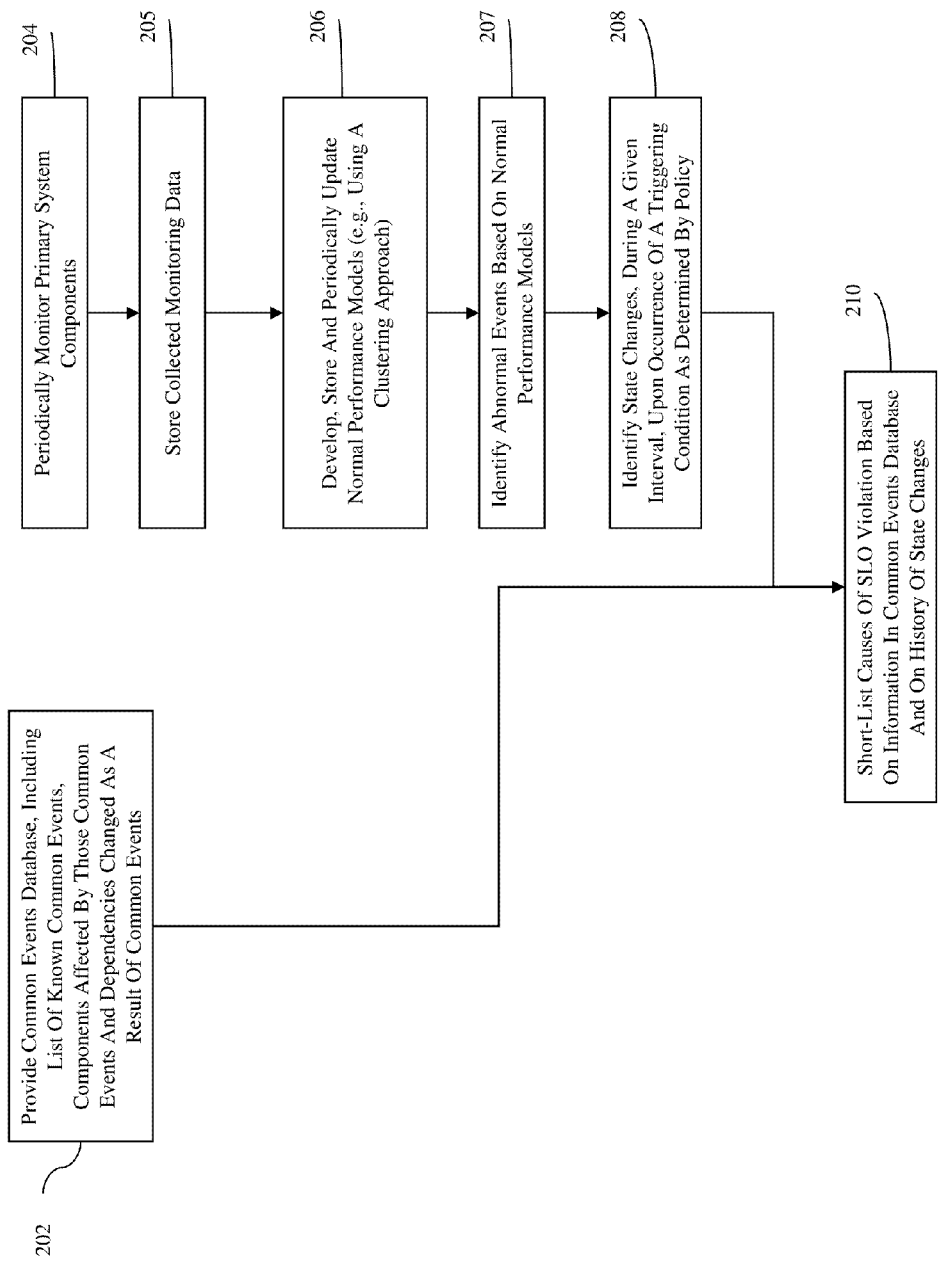
FIG. 2 is a flow diagram illustrating an embodiment of a method of the invention.

Additionally, referring to FIG. 2 in combination with FIG. 1, embodiments of an associated method for diagnosing probable causes (e.g., for developing a short-list of causes) of a violation of a performance objective (e.g., of a service level objective (SLO) violation) for an application being performed by a primary system (e.g., a large-scale storage system) are disclosed.

The method can comprise providing, based on expert and industry knowledge, a list of common events that may occur within the primary system and storing the list in a common events database 114 (202). Providing the list can further comprise indicating on the list all system components that are known to be affected by the common events as well as indicating changes in dynamic dependencies resulting from the common events.

The method can also comprise periodically monitoring a plurality of the system components 131-134 within the different tiers (e.g., application servers, interconnect switches, controllers, disks, etc.) of the I/O invocation paths of the applications being performed by the primary system 130

(204). This periodic monitoring can be accomplished, for example, using a performance monitoring system comprising a plurality of corresponding monitoring agents that are adapted to sense measurable performance parameters. The measured performance parameters for each of the system components can be stored as collected data in a data storage device 103, such as a database within a performance monitoring system 102 (205).

Next, normal performance models for the system components (i.e., for the components 131-134 of the primary system 130 that are within the invocation path of a given application) can be automatically developed by an abnormality detection system 104 and stored within a data storage device 106, such as a database within the abnormality detection system 104 (206). These normal performance models can be developed based on the periodically collected data (i.e., the measured performance data in storage device 103) from the performance monitoring system 102. Once the normal performance models are developed at process 206, they can be used to automatically identify abnormal events occurring in the invocation path of a given application (207). An abnormal event being an event that occurs during operation of the application and which is out side normal operating parameters as established and defined by the normal performance models. A record of the abnormal events can similarly be stored a storage device 106, such as a database within the abnormality detection system 104. The normal performance models can be developed and the abnormal events can be identified using, for example, a data clustering approach or any other suitable approach.

Then, any state changes exhibited, during a given time interval, by any of the system components 131-134 within the I/O invocation path of the application can be automatically identified using a state generator 108 and stored in a data storage device 112, such as a database within the state generator 108 (208). Identifying the state changes can comprise identifying run-time changes that, for a given component, will impact at least one of workload access, cumulative load, response-time and throughput for a given load characteristic, dependencies and workflow of the application. This state changes identification process (i.e., operation of the state generator) can be initiated upon the occurrence of a triggering condition, as opposed to being performed continuously or periodically (i.e., at regular intervals). For example, this process can be triggered by the identification of any abnormal event during the running of the application, by the identification of at least one specified type of abnormal event during the running of the application, by the identification of a specified number of abnormal events during the running of the application, by the identification of a specified number of a specified type of abnormal events during the running of the application, etc. Thus, the given time interval in which the state changes are identified is the period between the point in time, before the occurrence of the triggering condition occurs, when the performance parameter data was last collected and stored by the performance monitoring system, and the point in time, after the occurrence of the triggering condition, when the performance parameter data is next collected.

Once these state changes are identified at process 208, a set of events that are probable causes for the violation of the performance objective (i.e., a short-list of SLO violation causes) can be automatically determined, by using a processor to correlate the common events listed in the common events database (including the components that are known to be affected by the common events as well as the changes in dynamic dependencies that result from the common events) with the history of state changes recorded in the state changes database (210).

More particularly, the system and method of the present invention is designed to assist storage administrators in short-listing the root-cause of a service level objective (SLO) violation in an end-to-end fashion. The focus is primarily on root-causes for performance violations with an emphasis on having self-evolving component-level normality models. The disclosed mechanisms are scalable with regard to the number of system components and are compact enough to preserve and parse a significant amount of system history. This approach of using component-level normality models can complement prior art methods of diagnosing the root-cause of an SLO violation by providing the next level of drill-down required to further understand the run-time changes responsible for the violation.

Referring again to FIG. 1, the system 100 of the present invention runs on one or more management nodes. The abnormality detection module 104 extracts load and performance data from the monitoring database 103, compares it to a cluster-based model of normality for load and performance to classify it as normal/abnormal and updates the model 106 with the new information to evolve the notion of normality. If the data is classified as abnormal the snapshot generator (i.e., the state generator 108) is triggered. Policy-based triggers (see policy 110) for run-time events as well as threshold violations (SLOs) complement triggers from the clustering-based abnormality detection. That is, while trigger policies 110 can be defined for well-known events such as failures, migration of data, cache reallocation, etc., the clustering-based approach treats the system as a black-box, and detects both known as well as ghost events with varying degrees of confidence. By triggering snapshots based on system events such as performance abnormalities and failures we are able to build a history of state changes that focuses on the interesting times for the system 100.

The state changes history 112 consists of a series of snapshots recorded over a period of time, at a later stage, when the administrator wants to understand the root-cause of a performance abnormality, his queries 118 to the system 100 and, specifically, to the processor 116 are typically of the form:

---

Select * from changes such that application=$a_1$, perf violation= latency AND start time=$t_1$ AND end time=$t_2$.

---

In response to these queries 118, the diagnosis module (i.e., processor 116) analyzes the state-history 112 for the series of snapshots between $t_1$ and $t_2$; uses the invocation path of application $\alpha_1$ to filter unrelated run-time changes; ranks the list of relevant changes for the administrator, using the load dependency for $\alpha_1$ and connected components, as well as whether the change is well-known (i.e., has a policy defined).

More particularly, the purpose of the diagnostic system 100 and method of the present invention is to diagnose the root-causes of end-to-end performance objective violations. To that end, the abnormality detection system 104 is adapted to detect the causes and effects of potential problems in the system 130. The possible effects must be detected in order to determine that a problem has occurred. Additionally, the possible causes must be tracked, for example, by the state generator 108, so that once a problem is detected a determination can be made as to what may have caused the problem. Causes and effects can be determined by the processor 116 by considering abnormal events in light of changes in the system state, such as changes in the workflow or performance of the system, as determined by the snapshot generator 108, as well as by considering known causes and effects, as stored in the common events database 114.

The Abnormality Detection System 104

The abnormality detection module 104 extracts information from the database 103 of the performance monitoring system 102. This monitoring system database 103 contains collected measured performance data from the components 131-134 of the system 10 and is updated periodically (e.g., every five minutes, every ten minutes, etc.) by monitoring system agents. The abnormality detection module 104 is adapted to structures the plethora of monitored data from the database 103 into normality models (i.e., normal performance models) and to store those models in a storage device 106. The abnormality detection module 104 is further adapted to determine in light of those models when an abnormal event occurs within the components 131-134 of the system 130. Such abnormal events can comprise run-time system-induced events as well as human-induced events, including failures, storage component overloads, changes in the input/output (IO) access characteristics due to changes in the application configuration, application or hardware additions, etc. The abnormality detection system 104 can be adapted to develop these normal performance models and to identify any abnormal events by using a data clustering approach or any other approach capable of developing normality models and identifying abnormal events based on those models.

For example, U.S. patent application Ser. No. 11/348,010, of Duyanovich, et al., filed on Feb. 6, 2006, entitled "SYSTEM AND METHOD FOR RECORDING BEHAVIOR HISTORY FOR ABNORMALITY DETECTION," and incorporated herein by reference, discloses an exemplary abnormality detection system 104 using a data clustering approach that may be incorporated into the present invention. Specifically, as incorporated into the present invention, such an abnormality detection system 104 can be adapted to extract raw load and performance measure data from the monitoring system database 103 and to evolve and store (e.g., in database 106) normality models for load and performance by using a clustering approach. That is, under normal conditions the performance of a given system component (e.g., 131-134) should be similar under similar loads. The load is considered to be an input and the performance to be an output of the given system component that is monitored. In order to determine if a monitored system component (e.g., 131-134) is performing normally, the load (input) data is used by the abnormality detection system 104 to find what the normal performance (output) should be based on history and then compared to the current performance (i.e., the current output). This can be represented as N(L)=P, where N is the model of normality for performance, L is the load measurement, and P is the normal performance for the load L. As implemented in the present invention L=<rw, rs, sz, iops>where rw is the read/write ratio, rs is the random/sequential ratio, sz is the average request size, and iops is the IOs per second. P=<lat>where lat is the average latency of requests.

Additionally, the abnormality detection module 104 is adapted to maintain a history of the dependencies of each workload, as well as changes to the workflow. Any changes to the workflow are considered abnormalities. The dependencies are represented as historical mean and variance can be calculated by using either a moving average over some window of time, or to be more space efficient, by using a decay factor to give less weight to older data. In our implementation we use the decay factor $0<\alpha<1$ and calculate the mean and variance for $x_n$ as described in "Using experience to guide web server selection" by Gullickson et al., published in *Multimedia Computing and Networking* in January 1999:

$$\mu = \alpha x_n + (1-\alpha)\mu_{n-1}$$

$$\sigma^2 \alpha (x_n - \mu_{n-1})^2 + (1-\alpha)\sigma_{n-1}^2$$

Thus, an abnormality event is generated whenever the dependency values change by a certain number of standard deviations (e.g., based on the accepted false-positive rate) from the historical mean. By using a moving average the abnormality models can automatically adapt to changes in the system 130 over time. For instance, if a workload changes its working set of files to a new storage pool, the dependencies in the system 130 between these components will change. At first this can be correctly considered abnormal since the load has shifted. However, if a detected abnormality is not considered a problem that needs to be fixed (e.g., no actions are taken to resolve the abnormality), the abnormality detection system 104 will automatically evolve the models such that the new dependencies are considered.

To represent performance in terms of load N(L)=P, the abnormality detection system 104 can be adapted to use regression or analytical models to define an expression. However, these methods are brittle since the N(L)=P model they generate is static, and would need to be redefined every time the system 130 changed. Thus, alternatively, the abnormality detection system 104 can be adapted to use the performance history of the system 130 collected in database 103 to construct a mapping in order to track load to performance and to update the normality models incrementally. That is, the normal performance of the system components can be determined for a new measurement by finding a similar load to the new load and looking up the historical performance recorded. To build this mapping it would not be practical to store every entry, or even a percentage of entries (e.g., as illustrated in "Simple table-based modeling of storage devices" by Anderson and published in Technical Report HPL-SSP-2001-4, HP Laboratories in July 2001), since the resulting mapping would not be scalable over time in terms of storage space and search space for finding similar loads in the mapping. Thus, the abnormality detection system 104 incorporates an efficient structure that scales in $0(1)$ rather than $0(t)$, where t is time, in terms of space and search complexity. The load space could be partitioned statically and stored as an average performance for each partition; however, forming such partitions presents interesting issues. For example, if the load space is partitioned without knowing what range of loads will be encountered, all of the entries may wind up in one partition, or spread unsatisfactorily among some number of partitions.

Figure 3:
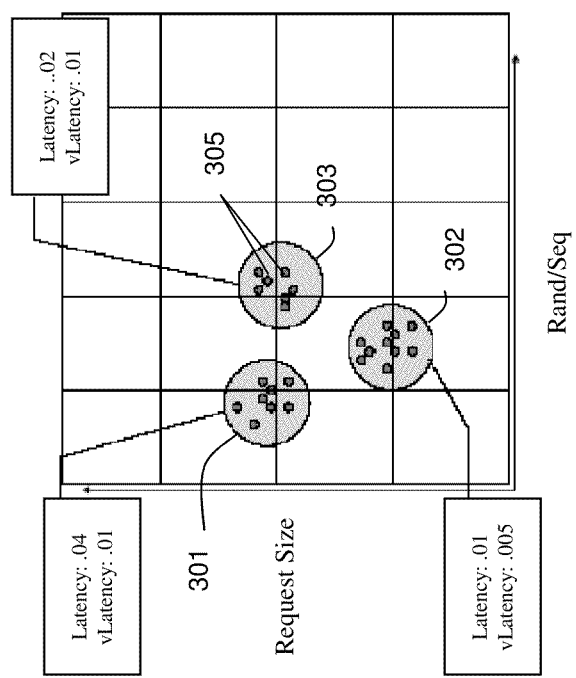
FIG. 3 is an illustration of an exemplary clustering diagram used in conjunction with a data clustering approach for determining normality models and identifying abnormal events.

Consequently, the abnormality detection system 104 of the present invention can be adapted to form partitions using a clustering technique to allow natural partitions to be formed around the data, e.g., as illustrated in FIG. 3. Specifically, since N(L)=P consists of clusters 301-303, each representing a group of similar loads L encountered in the past mapped to a performance P, which is considered to be the normal performance measurement for any load L that falls into that cluster. Clusters 301-303 are identified by their centroid (i.e., a point that is the average value of each element in the load L for the points 305 in the cluster). The abnormality detection system 104 is adapted to track the variance for each element of the load, as well as the number of points n 305 in each cluster 301-303.

The performance measurement for a cluster (e.g., 301-303) is represented by the mean and variance for each performance attribute measured. This representation of clusters 301-303 $X_i \rightarrow L_i$, $L_{i_{variance}}$, $P_i$, $P_{i_{variance}}$,;n, shown graphically in FIG. 3, greatly simplifies the amount of data collected to form the model over time and provides a structure that is meaningful and easy to access when a mapping needs to be looked up. FIG. 4 provides an exemplary illustration of how the information can be stored in the models and abnormal events database 106 for each of our models shown in FIG. 3.

In order to efficiently build and maintain clusters of our load measurements the abnormality detection system 104 can be adapted to use a sequential leader clustering technique (e.g., as outlined by Hartigan in "Clustering Algorithms", published by John Wiley & Sons, Inc. in 1975). Specifically, sequential leader clustering is an incremental approach that allows data to be added one point at a time. Thus, when a new measurement is received (e.g., $L_{new}$;$P_{new}$) the abnormality detection system 104 is adapted to automatically search the current clusters for the cluster whose centroid is closest to $L_{new}$. It then automatically measures distances in the cluster space by the weighted Euclidean distance measure.

$$D = \sqrt{\sum_{i=1}^{n} w_i (L_i - L_{new_i})^2}$$

Once the abnormality detection system 104 finds a cluster $X_j$ with the minimum distance $D_{min}$ to the current load $L_{new}$, it checks to see if the distance $D_{min}$ is less than a predetermined cluster threshold value C. If $D_{min} > C$, the abnormality detection system 104 automatically forms a new cluster $X_{new}$ where $L_{new}$ is the centroid and $P_{new}$ is the performance. The system 104 can be programmed to either assume the performance is normal to begin with or can be programmed to look for surrounding data and project or triangulate to estimate an expected range for the performance to test for abnormality (e.g., as illustrated in "Using information from prior runs to improve automated tuning systems" by Chung et al., published in *Proceedings of SC'04* in November 2004). Thus, if $D_{min} <= C$, then the system 104 can compare $P_{new}$ to $P_j$, the performance recorded in the history as normal for loads similar to $L_{new}$. Then, the number of standard deviations from the new performance measurement can be caluculated from the current normal and if it is above a predetermined abnormality threshold, $L_{new}$, $P_{new}$ can be considered an abnormal event.

The predetermined abnormality threshold can, for example, be based on some distribution (e.g., a Gaussian distribution) to specify the accepted false positive rate for abnormality detection. Regardless of whether $L_{new}$,$P_{new}$ is found to be abnormal, the abnormality detection system 104 automatically adds this point to the cluster $X_j$ and recalculates the centroid $L_j$ and its corresponding performance $P_j$, as well as variance, with $L_{new}$, $P_{new}$ included:

$L_{j_n} = \alpha L_{new} + (1-\alpha) L_{j_{n-1}}$ $L_{j_{nvariance}} = \alpha (L_{new} - L_{j_{n-1}})^2 + (1-\alpha) L_{j_{n-1 variance}}$ $P_{j_n} = \alpha P_{new} + (1-\alpha) P_{j_{n-1 variance}}$ $P_{j_{nvariance}} = \alpha (P_{new} - P_{j_{n-1}})^2 + (1-\alpha) P_{j_{n-1 variance}}$ Thus, the centroid is a moving average (using the decay factor method) as in the dependency model in order to give less weight to older values. By calculating performance as a moving average regardless of whether an abnormality is found, the abnormality detection system 104 allows the models of normality to automatically adapt to changes in the system 130 without having to be reset. For instance, if some action is taken on a component that improves its performance, the mapping by the abnormality detection system 104 will automatically adapt to the change in a reasonable amount of time so that the normal performance is better than it was previously.

Figure 5:
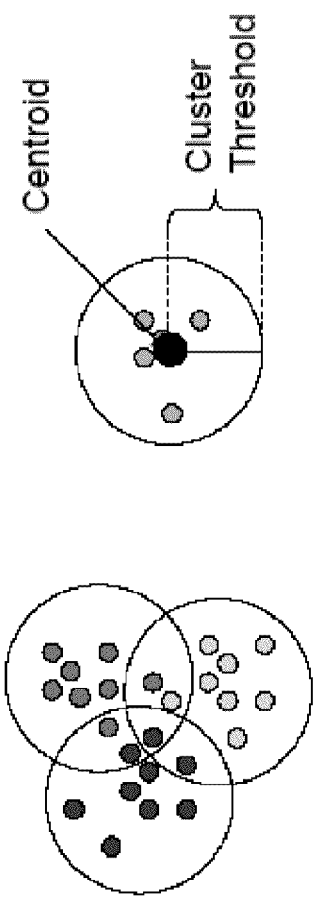
FIG. 5 is a diagram illustrating the moving average concept of the data clustering approach illustrated in FIG. 3.

By recalculating the centroids of clusters and forming new ones, the abnormality detection system 104 allows clusters to form and move towards the denser parts of the load space in order to form more meaningful clusters. In denser areas of the load space, clusters may overlap in coverage ($L_j$+C) as they move towards more recent measurements, but since the abnormality detection system 104 is adapted to always find the closest cluster when adding a new point, the clusters are in effect smaller in these areas. This allows for finer grain clustering in popular regions, e.g., as illustrated in FIG. 5.

The representation of historical load as clusters by the abnormality detection system 104 is useful for modeling normal load as well as performance. Load is considered abnormal if a new cluster is formed when updating the clusters or if the cluster updated is significantly far from the previously updated cluster. Load is considered to be significantly different if the distance between the two clusters is greater than twice the cluster threshold (i.e., the clusters do not overlap).

While load and performance are the only parameters that are incorporated into the normality models, as discussed above, those skilled in the art will recognize that additional parameters, e.g., time-of-day and burstiness, may similarly be incorporated into the normality models.

The abnormality detection system 104 of the present invention may further be adapted to maintain in storage 106 only a lightweight representation of the clusters by storing only the centroid, along with the number of points and their distribution. Specifically, keeping in mind that scalability is a key concern of storage administrators, cluster representation can be bounded in size and complexity. This can be accomplished by limiting the number of clusters maintained in storage 106 (e.g., to a predetermined number of clusters k). Thus, to add the k+1 cluster, two existing clusters will be merged (e.g., as illustrated in "High-performance robust speech recognition using stereo data" by Deng et al., published in *Proc. Of the Int. Conf. on Acoustics, Speech, and Signal Processing* in May 2001). Currently, to merge clusters, the two clusters that have the shortest centroid-to-centroid distances are selected. Since not all of the points in the cluster are stored for space efficiency, the clusters must be merged based on the centroid, which is the mean of all of the points, and the variance. Merging can therefore be done as merging two Gaussians ($\mu$;$\sigma$2) that represent the clusters of size n1 and n2 using the following formula:

$$\mu_{merged} = \frac{(n_1 \mu_1 + n_2 \mu_2)}{n_1 + n_2}$$

$$\sigma^2_{merged} = \frac{n_1(\sigma_1^2 + (\mu_1 - \mu)(\mu_1 - \mu)^t)}{n_1 + n_2} + \frac{n_2(\sigma_2^2 + (\mu_2 - \mu)(\mu_2 - \mu)^t)}{n_1 + n_2}$$

The new cluster is represented as ($\mu_{merged}$;$\sigma^2_{merged}$) with size n1+n2. The performance associated with each cluster is also merged using the same method to find the performance for the new cluster. It should be noted that tracking covariance for the clusters may also useful. For example, if k is large it may be sufficient to simply eliminate a cluster based on time or time and size in order to eliminate possible outliers.

At initialization of the abnormality detection system 104, all of its history databases will be empty and then the observed behavior of the system 130 at that time will be considered "normal". As the system 130 evolves and its performance changes for a given workload, abnormalities will be detected and made available to the system administrator; it is the system administrator's responsibility to decide whether an abnormality is considered a problem or not. The system administrator can then take corrective actions to tune system performance to desired levels if there is a problem, and the history will eventually be pulled towards the new performance values and consider the corrected state to be normal.

The cluster model used by the abnormality detection system 104 requires several predetermined thresholds to be set: cluster threshold C, abnormality threshold A, weights for load L elements, the number of clusters to track k, and the decay factor $\alpha$. A can be set based on the accepted false-positive rate. The weights for load L elements can be set using the coefficients from a linear regression on a quick bootstrapping session for each component that exercises a range of loads (e.g., as illustrated in "Using history o improve mobile application adaptation" by Narayanan et al., published in *Proceedings of the 3$^{rd}$ IEEE Workshop on Mobile Computing Systems*" in December 2000. The decay $\alpha$ can be set based on the rate of adaptation desired. The number of clusters k can be set based on the number of points that the system can afford to maintain and, finally, the cluster threshold C can be set based on k to cover the range of expected variance of load based on min/max request size, and IOPS. These thresholds do not prevent the abnormality detection system 104 from updating the models normality, rather they affect the overall accuracy in terms of the false-positive rate and the rate at which a model evolves. However, all of these thresholds can be refined automatically over time to improve the accuracy based on simple measurements. The cluster threshold can be adjusted based on the intra-cluster variance of the load and/or performance. The weights can be adjusted based on the range of values seen for each element in L and the covariance with P. The decay factor can be adjusted based on the rate of change/noise in the system. The abnormality threshold can be adjusted based on the actual false-positive rate encountered.

The Snapshot Generator 108

The snapshot generator 108 (i.e., the state generator 108) is adapted to maintain the state history. For the diagnostic system 100 of the present invention to be effective in large-scale systems 130 (e.g., large-scale enterprise storage systems), the state generator 108 is scalable in terms of size and complexity. Additionally, it is intelligent in that it is adapted to stores in storage 112 only those state changes that are necessary for diagnosis of potential problems later on. For example, the number of snapshots (i.e., records of state changes) recorded between time intervals $t_1$ and $t_2$ should: (1) be sufficient to address administrator queries on the run-time changes that happened during the time interval and their impact on system behavior; (2) be minimal in contrast to systems that take snapshots periodically or for every possible event that occurs in a system; and (3) consist of one or more of the following attributes: workflow, workflow dependency levels and the state of all system components (e.g., load and performance for all system components)

As mentioned above, the number of state snapshots stored by the state generator 108 should be minimal in contrast to systems that take snapshots periodically or for every possible event that occurs in a system. To accomplish this, the recording of snapshots is triggered by a combination of abnormal events detected by the abnormality detection module 104 and by policies 110. While abnormality detection is representative of the black-box approach for capturing variations using statistical correlations, these policies represent the white-box encoding of details for well-known events and existing best-practices used for threshold values of measurable parameters.

Thus, when an abnormality is detected by the abnormality detection system 104, the snapshot generator 108 (i.e., state generator) is notified and is adapted to check its policies 110 to see if a snapshot should be taken (i.e., to determine if the state of the system components should be determined and recorded in storage 112).

Figure 6:
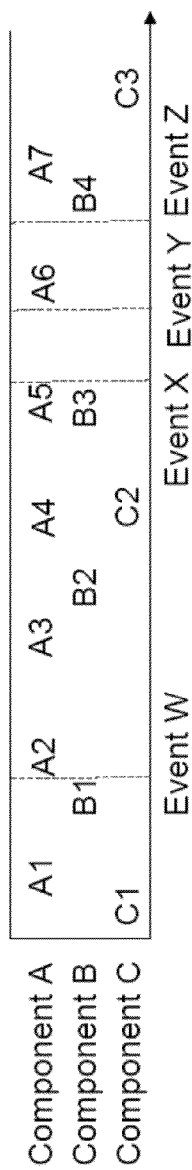
FIG. 6 is a table illustrating an exemplary state history representation for different events.

The triggering policies 110 may, for example, be based on any abnormality being detected, on the type of abnormality (e.g., latency, load change, etc.), on the number of abnormalities detected or on specified combinations of the type and numbers of abnormalities detected. Since the monitored data 103 is periodically reported, the state generator 108 can only determine the state over the period of time during which an abnormality occurred rather than at the exact time it occurred. Therefore, in order to summarize the state over the given time interval when the abnormal even occurred, the stage generator 108 is adapted to determine the state of the components at the beginning and at the end of the monitored period. Additionally, monitoring agents may not be synchronized (i.e., the may report monitored data from the different components at different times). Thus, for each component, the period of time for which the triggering abnormality event occurred will start and end at different times, as illustrated in FIG. 6.

Consequently, correlating and gathering a comprehensive state snapshot across all the components for an abnormality present a challenge. In order to record the state for each component before and after an abnormality has occurred, the state generator 108 is adapted to always store in storage 112 the current state until the next set of monitored data arrives. If there's an abnormality detected during the current monitoring period, a flag is set that specifies for all components to retain their current state, as well as storing in storage 112 the next new state that will come from the monitor, and associate this information with the triggering abnormality. If there was no abnormality in the system components between the current state and the new state the stage generator is adapted to overwrite the current state with the new state.

Figure 7:
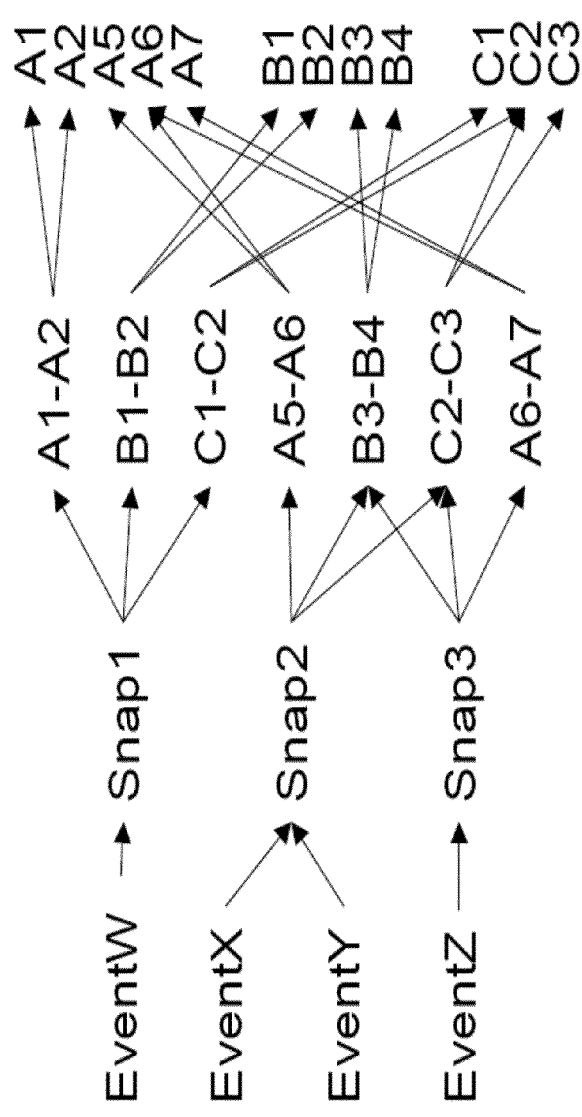
FIG. 7 is diagram illustrating an exemplary snapshot representation of the events of FIG. 6.

Additionally, in order to improve the scalability of the data structures for maintaining state history in storage 112, the state generator is adapted to store all monitored data only once, even if it is reference in to multiple snapshots. Storage 112 of state changes can, for example, be implemented as illustrate din FIG. 7. That is, each abnormality can be associated with a time, a snapshot and a duration (i.e., amount of time in which it may cause another abnormality). Events that occur close in time may reference the same snapshot, such as Event X and Event Y in FIG. 7. This snapshot contains pointers to a list of states for each component that represent the system state before and after the abnormality. These states are unique, and may be referenced by multiple snapshots if the values remain the same across snapshots, or if abnormalities occur during the same or adjacent monitoring intervals for a component. For example, a component may sit idle for several days, so all the snapshots taken during those days would point to the same state for that component. Alternatively, in the adjacent case, an abnormality may occur in two consecutive monitoring periods for a component, so the "after" sub-elements for the first snapshot will be the same as the "before" sub-elements of the next. For example, see state C2, in which both Event W and Event X reference it since they occur in adjacent monitoring periods for component C.

To reduce the size of the state history storage 112 over time, state generator 108 can be programmed to expired snapshots once the duration of all the events referencing it have passed. When a snapshot expires, the state generator can be programmed to delete it or, alternatively, to archive it by copying the data associated with it and versioning it against previous snapshots using more advanced compression.

The Processor 116

The processor 116 is adapted to perform a root-cause analysis, for example, for a performance objective violation (e.g., a service level objective (SLO) violation) based on information contained in the state changes database 112 of the state generator 108 and on commonly known data 114. Specifically, the processor 116 is adapted to receive queries 118 (e.g., from a storage administrator) about the performance of an application, a system component, a subset of the workflow, etc. An exemplary query 118 may ask, "why did the response time for application $\alpha_1$ increase from $r_1$ to $r_2$?" The diagnostic system 100 and, specifically, the processor 116 will output 120 a short-list of causes (e.g., of run-time changes that have occurred at one of more tiers of the workflow). This short-list may be sorted based on their predicted impact on the end-to-end system performance.

However, the relationship between cause and effect is not always straightforward. That is, a cause may have many effects and an effect may be the product of multiple causes. Further, the effect(s) of a cause may not be detectable until long after the cause has occurred. For example, the amount of time before the performance effects of reconfiguring a cache are detected may be significantly large depending on the level of load on the system. Thus, the processor is adapted to use a hybrid of component-level abnormal events data (e.g., acquired using a clustering approach) and of policy rules (i.e., known causes for common events). While normality models help in mapping the impact of changes (in one or more tiers of a system 130) to the end-to-end performance, the white-box rules define details of a subset of commonly occurring well-known storage events such as failures, data migration, RAID re-build.

Therefore, the processor 116 can be adapted to execute the following sequence of steps. First, the processor 116 can be adapted to determine the attributes of the query. For example, a storage administrator query will typically define the application/component name, the time interval, performance attribute. It may also define a specific component or a subset of the workflow. Next, the processor 116 can be adapted to reduce search space. That is, the processor 116 can be adapted to analyze state information contained in storage 112 with regard to the clustering-based normality models for all the tiers. Specifically, the processor 116 can further be adapted to use the state history database 112 to analyze, for all the components in the application's workflow, abnormalities that occurred in the time interval specified by the query. This state history 112 provides a temporal list of events (well-known as well as ghost events) and their duration, associated with the snapshot transitions. This analysis allows the processor to determine the possible causes of the violation identified in the query. The processor 116 can also be adapted to rank these possible causes. For example, the process 116 can rank the possible causes using dependency values (black-box) and policy information about cause-effect relationships (white box).

For example, in operation, the processor 116 can execute the following method steps. The processor 116 can receive a query, for example, in the format:

Select * from changes such that application=$a_1$, perf violation= latency AND start time=$t_1$ AND end time=$t_2$.

Next, the processor 116 can limit the search space for diagnosing a performance problem to the components reachable from the queried component according to the workflow at the time of the problem. The space is then reduced to the set of abnormalities (possible causes) whose effects may still be detectable during the period in which the problem was seen. This is done based on what we call elastic effects for a cause. Since the effects of causes will appear at varying times depending on the cause, each abnormality event in the state history is associated with a duration based on the type of event. This allows for a quick narrowing of the search space when looking for a cause to diagnose an abnormality since only causes whose duration intersects the time the effect was seen are of interest.

Analysis by the processor 116 starts with a simple policy that classifies possible causes as a root cause (e.g., a component was added to the configuration) or an indirect effect of a root cause (e.g., load for a component changed, due to the addition of a component). The processor analysis can be implemented, for example, using a general algorithm that starts with the time the problem was seen and the component it is on and recursively checks to see if root causes were found on connected components with workflow dependencies above 0 (during the period the abnormality was detected). Indirect causes in the chain are diagnosed as well to look for event chains. The workflow is recursively traversed in this fashion until a root cause is reached or a cycle is detected. Root causes found in this process are then ranked based on the total level of workflow dependence along the chain (measured at the time the abnormality was detected).

The dependence between two directly connected components can be treated as the weight $w_{(i,j)}$ of an edge between two nodes i and j. The total weight for a path between node 1 and n is then calculated as:

$$w_{(1,n)} = \prod_{i=1}^{n-1} w_{(i,i+1)}$$

Since measures of dependence are in the range [0-1] further down the graph, the dependence never increases. This means that in order to quickly find the top-k causes for a problem greedy approach can be taken, when performing the search defined above.

Specifically, the processor 116 can be adapted to always start the search from a node by taking the edge that has the greatest weight and then doing a depth first search until k causes are collected. Once k causes are collected, the processor 116 can be adapted to continue the search, without traversing further down any path once its dependence is smaller than the dependence for the kth cause. All of these paths can be skipped, since the dependence will not increase if the path is traversed any further. If the processor 116 identifies a cause with a higher dependence after the initial top-k are determined, it can be adapted to add that cause to the top-k and drop the kth cause. If the processor 116 does not determine any root causes, then it can be adapted to return the top-k connected abnormalities ranked by level of workflow dependence in order to provide some suggestions to the administrator.

After the impact of the change on the end-to-end performance is diagnosed by the processor 116, it can be adapted to store this cause-effect relationship mapping (e.g., in the common events database 114) so it does not have to be re-diagnosed.

Also disclosed is a program storage device readable by computer and tangibly embodying a program of instructions executable by that computer to perform the method the invention, described above. Specifically, the embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc. Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
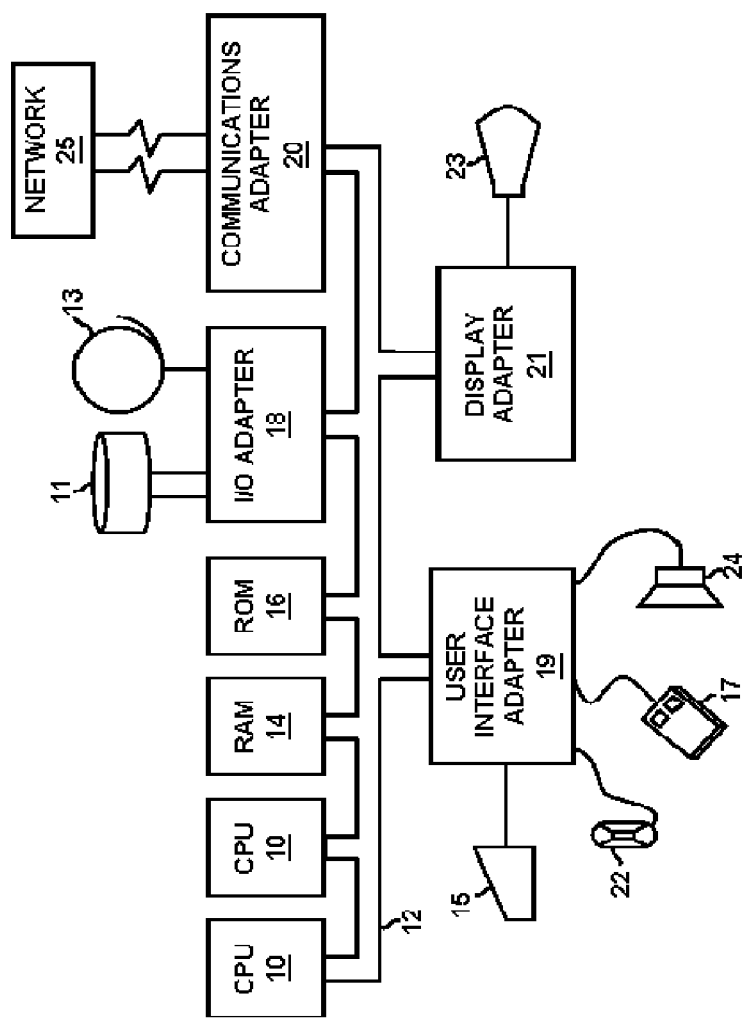
FIG. 8 a schematic representation of a computer system suitable for use in text processing as described herein.

A representative hardware environment for practicing the embodiments of the invention is depicted in FIG. 8. This schematic drawing illustrates a hardware configuration of an information handling/computer system in accordance with the embodiments of the invention. The system comprises at least one processor or central processing unit (CPU) 10. The CPUs IO are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Therefore, disclosed above are system and method embodiments for determining the root-causes of a performance objective violation, such as an end-to-end service level objection (SLO) violation, in a large-scale system with multi-tiered applications. This determination is made using a hybrid of component-level snapshots of the state of the system during a period in which an abnormal event occurred (i.e., black box mapping) and of known events and their causes (i.e., white-box mapping). Specifically, in response to a query about a violation (e.g., why did the response time for application a1 increase from r1 to r2), a processor will access and correlate the black-box and white-box mappings to determine a short-list of probable causes for the violation.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments of the invention can be practiced with modification within the spirit and scope of the appended claims.

What is claimed is:

1. A diagnostic system for a storage system comprising:
 a monitoring system comprising a plurality of monitoring agents periodically collecting measured performance parameter data from components of said storage system, said components being within an invocation path of a specific application being run by said storage system, said components comprising multiple different types of components and said multiple different types of components comprising any of servers, interconnect switches, controllers and disks;
 an abnormality detection system automatically and periodically updating normal performance models for said components and, based on said normal performance models, identifying abnormal events occurring in said invocation path during running of said specific application by said storage system,
  said updating of said normal performance models comprising, as said measured performance parameter data is collected, automatically sorting said measured performance parameter data into clusters and recalculating centroids of said clusters, and
  said abnormal events being associated with any of said measured performance parameter data outside a predetermined threshold distance from a closest one of said centroids;
 a state generator in communication with said monitoring system and said abnormality detection system, said state generator determining when at least one of said abnormal events identified by said abnormality detection system is a triggering condition as defined by a predetermined policy and, only in response to said triggering condition occurring during said running of said specific application, operating to identify different states of said components,
  said operating comprising, based on said measured performance parameter data from said components, identifying first states of said components at a beginning point in a given time interval and second states of said components at an end point in said given time interval and, based on a comparison of said first states and said second states, further identifying any state changes exhibited by any of said components between said beginning point and said end point,
for each component, said beginning point being when said measured performance parameter data was most recently collected from said component prior to the occurrence of said triggering condition and said end point being when said measured performance parameter data is next collected from said component after said occurrence of said triggering condition, and;
a database comprising a list of common events that occur within said storage system and that are known to impact performance of said components of said storage system, said list indicating which of said components are known to be affected by which of said common events; and
a processor receiving a report of an end-to-end performance objective violation of said specific application as run by said storage system, said violation occurring in a specified time period and said processor further determining which of said state changes occurred during said specified time period, identifying specific abnormal events associated with said state changes that occurred during said specific time period and correlating said common events on said list with said specific abnormal events in order to determine a set of events that are probable causes for said violation.

2. The diagnostic system of claim 1, said list further indicating changes in dynamic dependencies resulting from said common events and said processor further considering said changes in said dynamic dependencies during said correlating to determine said set of events.

3. The diagnostic system of claim 1, said monitoring agents sensing measurable performance parameters from said components.

4. The diagnostic system of claim 1, said recalculating of said centroids comprising applying a decay factor that gives greater weight to newly collected data in said clusters as compared to previously collected data.

5. The diagnostic system of claim 1, said policy defining said triggering condition as any one of the following: identification of any one abnormal event, identification of any one specified type of abnormal event, identification of a specified number of any type of abnormal event and identification of a specified number of a specified type of abnormal event.

6. The diagnostic system of claim 1, said abnormal events comprising system-induced abnormal events and human-induced abnormal events and said common events comprising commonly occurring system-induced events and commonly occurring human-induced events.

7. The diagnostic system of claim 1, said state changes comprising run-time changes that will impact at least one of workload access, cumulative load, response-time and throughput for a given load characteristic, dependencies and workflow of said specific application.

8. A diagnostic method comprising:
periodically collecting, by a plurality of monitoring agents of a monitoring system, measured performance parameter data from components of a storage system, said components being within an invocation path of a specific application being run by said storage system, said components comprising multiple different types of components and said multiple different types of components comprising any of servers, interconnect switches, controllers and disks;
automatically and periodically updating, by an abnormality detection system normal performance models for said components, said updating of said normal performance models comprising, as said measured performance parameter data is collected, automatically sorting said measured performance parameter data into clusters and recalculating centroids of said clusters;
identifying, by said abnormality detection system and based on said normal performance models, abnormal events occurring in said invocation path during running of said specific application by said storage system, said abnormal events being associated with any of said measured performance parameter data outside a predetermined threshold distance from a closest one of said centroids;
storing, in a database, a list of common events that occur within said storage system and that are known to impact performance of said components of said storage system, said list indicating which of said components are known to be affected by which of said common events;
determining, by a state generator in communication with said monitoring system and said abnormality detection system, when at least one of said abnormal events identified by said abnormality detection system is a triggering condition as defined by a predetermined policy;
only in response to said triggering condition, identifying, by said state generator, first states of said components at a beginning point in a given time interval and second states of said components at an end point in said given time interval, based on said measured performance parameter data;
based on a comparison of said first states and said second states, identifying, by said state generator, any state changes exhibited by any of said components between said beginning point and said end point,
for each component, said beginning point being when said measured performance parameter data was most recently collected from said component prior to the occurrence of said triggering condition and said end point being when said measured performance parameter data is next collected from said component after said occurrence of said triggering condition;
receiving, by a processor, a report of an end-to-end performance objective violation of said specific application as run by said storage system, said violation occurring in a specified time period;
determining, by said processor, which of said state changes occurred during said specified time period and identifying specific abnormal events associated with said state changes that occurred during said specific time period; and
correlating, by said processor, said common events on said list with said specific abnormal events in order to determine a set of events that are probable causes for said violation.

9. The method of claim 8, said list further indicating changes in dynamic dependencies resulting from said common events and said method further comprising, during said correlating, considering said changes in said dynamic dependency to determine said set of events.

10. The method of claim 8, said monitoring agents sensing said measurable performance parameters from said components.

11. The method of claim 8, said recalculating of said centroids comprising applying a decay factor that gives greater weight to newly collected data in said clusters as compared to previously collected data.

12. The method of claim 8, said policy defining said triggering condition as any one of the following: identification of any one abnormal event, identification of any one specified type of abnormal event, identification of a specified number of any type of abnormal event and identification of a specified number of a specified type of abnormal event.

13. The method of claim 8, said abnormal events comprising system-induced abnormal events and human-induced abnormal events and said common events comprising commonly occurring system-induced events and commonly occurring human-induced events.

14. The method of claim 8, said state changes comprising run-time changes that will impact at least one of workload access, cumulative load, response-time and throughput for a given load characteristic, dependencies and workflow of said specific application.

15. A non-transitory program storage device readable by computer and tangibly embodying a program of instructions executable by said computer to perform a diagnostic method, said diagnostic method comprising:
 periodically collecting measured performance parameter data from components of a storage system, said components being in an invocation path of a specific application being run by said storage system, said components comprising multiple different types of components and said multiple different types of components comprising any of servers, interconnect switches, controllers and disks;
 automatically and periodically updating normal performance models for said components, said updating of said normal performance models comprising, as said measured performance parameter data is collected, automatically sorting said measured performance parameter data into clusters and recalculating centroids of said clusters;
 identifying, based on said normal performance models, abnormal events occurring in said invocation path during running of said specific application by said storage system, said abnormal events being associated with any of said measured performance parameter data outside a predetermined threshold distance from a closest one of said centroids;
 storing a list of common events that occur within said storage system and that are known to impact performance of said components of said storage system, said list indicating which of said components are known to be affected by which of said common events;
 determining when at least one of said abnormal events is a triggering condition as defined by a predetermined policy;
 only in response to said triggering condition, identifying, based on said measured performance parameter data, first states of said components at a beginning point in a given time interval and second states of said components at an end point in said given time interval;
 based on a comparison of said first states and said second states, further identifying any state changes exhibited by any of said components between said beginning point and said end point,
  for each component, said beginning point being when said measured performance parameter data was most recently collected from said component prior to the occurrence of said triggering condition and said end point being when said measured performance parameter data is next collected from said component after said occurrence of said triggering condition;
 receiving a report of an end-to-end performance objective violation of said specific application as run by said storage system, said violation occurring in a specified time period;
 determining which of said state changes occurred during said specified time period;
 identifying specific abnormal events associated with said state changes that occurred during said specific time period; and
 correlating said common events on said list with said specific abnormal events in order to determine a set of events that are probable causes for said violation.

16. The non-transitory program storage device of claim 15, said list further indicating changes in dynamic dependencies resulting from said common events and said method further comprising, during said correlating, considering said changes in said dynamic dependency to determine said set of events.

17. The non-transitory program storage device of claim 15, said policy defining said triggering condition as any one of the following: identification of any one abnormal event, identification of any one specified type of abnormal event, identification of a specified number of any type of abnormal event and identification of a specified number of a specified type of abnormal event.

18. The non-transitory program storage device of claim 15, said calculating of said centroids comprising applying a decay factor that gives greater weight to newly collected data in said clusters as compared to previously collected data.

* * * * *